(12) United States Patent
Wu

(10) Patent No.: US 12,192,845 B2
(45) Date of Patent: Jan. 7, 2025

(54) CELL MANAGEMENT METHOD, CELL MANAGEMENT CONFIGURATION METHOD, AND TERMINAL

(71) Applicant: VIVO MOBILE COMMUNICATION CO., LTD., Guangdong (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 367 days.

(21) Appl. No.: 17/718,930

(22) Filed: Apr. 12, 2022

(65) Prior Publication Data

US 2022/0240135 A1 Jul. 28, 2022

Related U.S. Application Data

(63) Continuation of application No. PCT/CN2020/126366, filed on Nov. 4, 2020.

(30) Foreign Application Priority Data

Nov. 7, 2019 (CN) .......................... 201911084329.X

(51) Int. Cl.
*H04W 36/36* (2009.01)
*H04W 36/00* (2009.01)

(52) U.S. Cl.
CPC ..... *H04W 36/362* (2023.05); *H04W 36/0069* (2018.08); *H04W 36/0085* (2018.08); *H04W 36/00692* (2023.05)

(58) Field of Classification Search
CPC .............. H04B 7/024; H04W 36/0069; H04W 36/0011; H04W 36/0085
See application file for complete search history.

(56) References Cited

U.S. PATENT DOCUMENTS 9,860,829 B2 * 1/2018 Hou ...................... H04W 24/00
2012/0225657 A1 * 9/2012 Watanabe ......... H04W 36/0085
455/436

(Continued)

FOREIGN PATENT DOCUMENTS

CN 102083161 A 6/2011
CN 104769986 A 7/2015
(Continued)

OTHER PUBLICATIONS

First Office Action regarding Indian Patent Application No. 202247024319, dated Sep. 6, 2022.
(Continued)

*Primary Examiner* — Raj Jain
(74) *Attorney, Agent, or Firm* — Harness, Dickey & Pierce, P.L.C.

(57) ABSTRACT

A cell management method includes: receiving configuration information sent by a network side device, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, M is greater than 1, and N is greater than or equal to 1; and managing the M cells according to the configuration information.

20 Claims, 4 Drawing Sheets

(56) References Cited

U.S. PATENT DOCUMENTS

| | | | |
|---|---|---|---|
| 2012/0276945 A1* | 11/2012 | Chindapol | H04W 48/20 |
| | | | 455/525 |
| 2012/0281544 A1* | 11/2012 | Anepu | H04B 7/0632 |
| | | | 370/328 |
| 2014/0241323 A1 | 8/2014 | Park et al. | |
| 2015/0133081 A1* | 5/2015 | Griot | H04M 15/58 |
| | | | 455/552.1 |
| 2015/0327094 A1 | 11/2015 | Lee et al. | |
| 2016/0330704 A1 | 11/2016 | Takahashi et al. | |
| 2016/0345222 A1* | 11/2016 | Axmon | H04W 36/324 |
| 2017/0311374 A1 | 10/2017 | Chang et al. | |
| 2020/0305216 A1* | 9/2020 | Kim | H04W 76/19 |
| 2021/0014746 A1 | 1/2021 | Wu | |
| 2021/0014865 A1 | 1/2021 | Zheng et al. | |
| 2021/0099927 A1 | 4/2021 | Wu | |
| 2021/0345191 A1* | 11/2021 | Da Silva | H04W 36/00837 |
| 2022/0124590 A1* | 4/2022 | Da Silva | H04B 7/0695 |
| 2022/0240135 A1* | 7/2022 | Wu | H04W 36/0069 |

FOREIGN PATENT DOCUMENTS

| | | |
|---|---|---|
| CN | 104904254 A | 9/2015 |
| CN | 106576107 A | 4/2017 |
| CN | 110278574 A | 9/2019 |
| CN | 110278587 A | 9/2019 |
| CN | 110290530 A | 9/2019 |
| CN | 110418365 A | 11/2019 |
| WO | WO-2022028920 A1 | 2/2022 |

OTHER PUBLICATIONS

Supplementary European Search Report regarding European Patent Application No. 20884629.5-1216, dated Nov. 9, 2022.

Conditional NR PSCell addition/change procedures, Qualcomm Incorporated, 3GPP TSG-RAN WG2 Meeting #107bis, R2-1912297, dated Oct. 18, 2019.

"Discussion on the configuration of CHO execution conditions," ZTE Corporation, Sanechips, 3GPP TSG RAN WG2 Meeting #106, R2-1907091, dated May 17, 2019.

First Office Action regarding Chinese Patent Application No. 201911084329.X, dated Aug. 30, 2021. Translation provided by Bohui Intellectual Property.

Second Office Action regarding Chinese Patent Application No. 201911084329.X, dated Feb. 24, 2022. Translation provided by Bohui Intellectual Property.

International Search Report and Written Opinion of the International Searching Authority regarding International Patent Application No. PCT/CN2020/126366, dated Feb. 3, 2021. Translation provided by Bohui Intellectual Property.

"Discussions on NR Conditional Handover Procedures," MediaTek Inc., 3GPP TSG-RAN WG2 Meeting #106, R2-1906482, dated May 17, 2019.

Notice of Hearing for Indian Patent Application No. 202247024319, dated Feb. 22, 2024.

First Office Action regarding Korean Patent Application No. 10-2022-7014280, dated Aug. 13, 2024.

* cited by examiner

CELL MANAGEMENT METHOD, CELL MANAGEMENT CONFIGURATION METHOD, AND TERMINAL

CROSS-REFERENCE TO RELATED APPLICATIONS

This application is a Bypass Continuation Application of PCT/CN2020/126366, filed on Nov. 4, 2020, which claims priority to Chinese Patent Application No. 201911084329.X filed on Nov. 7, 2019, which are incorporated herein by reference in their entirety.

TECHNICAL FIELD

The present disclosure relates to the field of communications technologies, and in particular to a cell management method, a cell management configuration method, a terminal, and a network side device.

BACKGROUND

During random access, a terminal may perform a conditional handover between cells. That is, cells may be managed in a conditional trigger manner. During the conditional handover, a network side device sends configuration information for conditional handover to the terminal. The terminal may evaluate, according to the configuration information for conditional handover, whether candidate cells meet a condition. If the candidate cells meet the condition, the terminal may select a target cell to perform a handover. In the related art, a conditional handover is only applied to random access technology. For a scenario in which one terminal is connected to a plurality of (including two) cells, for example, dual connectivity (DC) and carrier aggregation (CA), a conditional handover solution in the related art is not applicable.

SUMMARY

Embodiments of the present disclosure provide a cell management method, a cell management configuration method, a terminal, and a network side device.

According to a first aspect, the embodiments of the present disclosure provide a cell management method, applied to a terminal, the method including:
receiving configuration information sent by a network side device, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, M is greater than 1, and N is greater than or equal to 1; and
managing the M cells according to the configuration information.

According to a second aspect, the embodiments of the present disclosure further provide a cell management configuration method, applied to a network side device, the method including:
sending configuration information to a terminal, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, the configuration information is used for managing the M cells by the terminal, M is greater than 1, and N is greater than or equal to 1.

According to a third aspect, the embodiments of the present disclosure further provide a terminal, including:
a receiving module, configured to receive configuration information sent by a network side device, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, M is greater than 1, and N is greater than or equal to 1; and
a management module, configured to manage the M cells according to the configuration information.

According to a fourth aspect, the embodiments of the present disclosure further provide a network side device, including:
a sending module, configured to send configuration information to a terminal, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, the configuration information is used for managing the M cells by the terminal, M is greater than 1, and N is greater than or equal to 1.

According to a fifth aspect, the embodiments of the present disclosure further provide another terminal, including: a memory, a processor, and a program stored in the memory and executable on the processor, where the program implements the steps of the cell management method in the first aspect of the embodiments of the present disclosure when being executed by the processor.

According to a sixth aspect, the embodiments of the present disclosure further provide another network side device, including: a memory, a processor, and a program stored in the memory and executable on the processor, where the program implements the steps of the cell management configuration method in the second aspect of the embodiments of the present disclosure when being executed by the processor.

According to a seventh aspect, the embodiments of the present disclosure further provide a non-transitory computer-readable storage medium, storing a computer program, where the computer program implements the steps of the cell management method in the first aspect of the embodiments of the present disclosure when being executed by a processor; or the computer program implements the steps of the cell management configuration method in the second aspect of the embodiments of the present disclosure when being executed by a processor.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings.

DETAILED DESCRIPTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure shall fall within the protection scope of the present disclosure.

In addition, the terms "include" and any variant thereof in the description and claims of the present application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the description and claims represents at least one of connected objects. For example, A and/or B represents the following three cases: Only A exists, only B exists, and both A and B exist.

In addition, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more optional or having more advantages than another embodiment or design scheme. Exactly, use of the word "example" or "for example" or the like is intended to present a related concept in a specific manner.

The following describes the embodiments of the present disclosure with reference to the accompanying drawings. A cell management method and a cell management configuration method provided in the embodiments of the present disclosure are both applicable to a wireless communications system. The wireless communications system may be a 5th Generation (5G) system, an evolved long term evolution (eLTE) system, or a subsequent evolved communications system.

Figure 1:
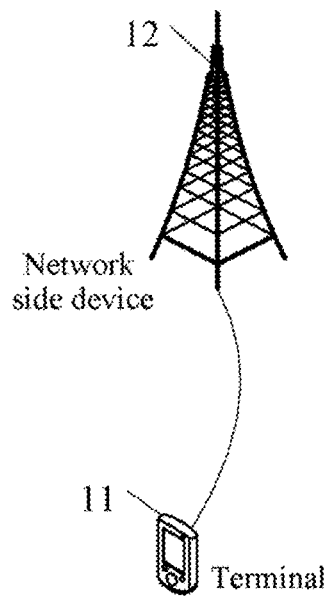
FIG. 1 is a structural diagram of a network system to which the embodiments of the present disclosure are applicable.

FIG. 1 is a structural diagram of a network system to which the embodiments of the present disclosure are applicable. As shown in FIG. 1, the network system includes a terminal 11 and a network side device 12. The terminal 11 may be a user terminal or another terminal side device, for example, a terminal side device such as a mobile phone, a tablet personal computer, a laptop computer, a personal digital assistant (PDA), a mobile Internet device (MID), or a wearable device. It needs to be noted that in the embodiments of the present disclosure, a specific type of the terminal 11 is not limited. The foregoing network side device 12 may be a 5G base station, or a base station of a later version, or a base station in another communications system, or referred to as a node, an evolved node, or a transmission reception point (TRP), or an access point (AP), or another word in the field. As long as the same technical effect is achieved, the network side device is not limited to a specific technical word. In addition, the network side device 12 may be a master node (MN) or a secondary node (SN). It needs to be noted that only a 5G base station is used as an example in the embodiments of the present disclosure, but a specific type of the network side device is not limited.

Figure 2:
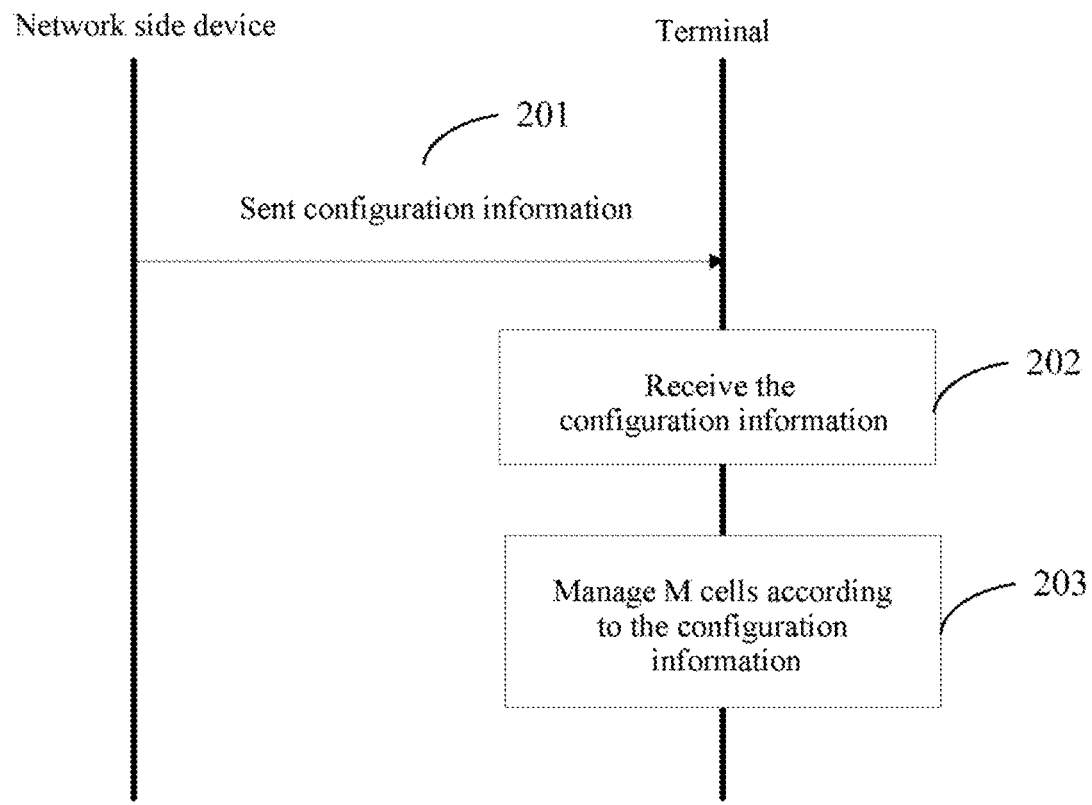
FIG. 2 is a flowchart of a cell management method according to an embodiment of the present disclosure.

FIG. 2 is a flowchart of a cell management method according to an embodiment of the present disclosure. The method is applied to the network system shown in FIG. 1. As shown in FIG. 2, the method includes the following steps.

Step 201: A network side device sends configuration information to a terminal.

The configuration information includes cell management configuration information and a triggering condition group corresponding to the cell management configuration information, the triggering condition group includes N triggering conditions associated with M cells, each cell of the M cells is associated with at least one triggering condition of the N triggering conditions, the configuration information is used for managing the M cells by the terminal, M is greater than 1, and N is greater than or equal to 1.

It should be noted that L (L is greater than or equal to M) cells may be configured in the cell management configuration information. The L cells include the foregoing M cells. That is, in addition to the foregoing M cells, more cells may be configured in the cell management configuration information.

The M cells may be a serving cell or a non-serving cell. The non-serving cell may include a neighboring cell. The serving cell may be a serving cell currently configured for use by the terminal, for example, a primary cell (PCell), a primary secondary cell (PSCell), or a secondary cell (SCell).

There may be a plurality of association relationships between the N triggering conditions in the foregoing triggering condition group and the foregoing M cells, as long as it is ensured that each cell is associated with at least one triggering condition. To better understand association relationships between the N triggering conditions in the foregoing triggering condition group and the foregoing M cells, examples are provided below for description.

For example, it is assumed that the foregoing M cells include a cell a and a cell b, the foregoing triggering condition group includes a plurality of triggering conditions, some (one or more) triggering conditions in the plurality of triggering conditions are associated with the cell a, and some (one or more) triggering conditions are associated with the cell b. That is, any cell may be associated with one triggering condition or may be associated with a plurality of triggering conditions. One triggering condition in the foregoing triggering condition group may be associated with the cell a and the cell b. For example, one triggering condition in the foregoing triggering condition group is that measured signal quality of a neighboring cell is greater than a threshold. If the triggering condition is associated with the cell a, the neighboring cell is the cell a. If the triggering condition is associated with the cell b, the neighboring cell is the cell b.

Step 202: The terminal receives the configuration information.

Step 203: The terminal manages the M cells according to the configuration information.

In the embodiments of the present disclosure, a triggering condition group used for cell management is configured for a terminal, and one or more triggering conditions associated with a plurality of cells are configured in the triggering condition group. In this way, the terminal can manage the plurality of associated cells according to the triggering conditions in the triggering condition group. Because the terminal can manage the plurality of cells, the cell management method in the embodiments of the present disclosure is applicable to a multi-cell connection scenario, so that the terminal can implement a conditional handover between cells in the multi-cell connection scenario.

In addition, in the embodiments of the present disclosure, the terminal can manage the plurality of cells by using triggering conditions. Therefore, during a conditional handover between cells in a multi-cell connection scenario, it can be ensured that the terminal selects a cell with relatively high signal quality for the conditional handover between cells, thereby ensuring the channel quality after the terminal is handed over between cells. In this way, in one aspect, the communication performance after the terminal is handed over between cells can be improved, and in another aspect, a waste of a reserved resource of a cell due to a failure in normal use because of excessively low channel quality of the cell after the handover can be avoided.

Optionally, the cell management configuration information includes dual connectivity configuration information or carrier aggregation configuration information.

In the related art, the multi-cell connection scenario includes a dual connectivity scenario and a carrier aggregation scenario. Therefore, the cell management solution provided in the embodiments of the present disclosure is applicable to a conditional handover between cells in dual connectivity and is also applicable to a conditional handover between cells in carrier aggregation.

In the embodiments of the present disclosure, the network side device may use the cell management configuration information to configure a conditional handover between cells in dual connectivity or carrier aggregation for the terminal. In some examples, the cell management configuration information may include dual connectivity configuration information, and the network side device uses the dual connectivity configuration information to configure a conditional handover between cells in dual connectivity for the terminal. Alternatively, the cell management configuration information may include carrier aggregation configuration information, and the network side device uses the carrier aggregation configuration information to configure a conditional handover between cells in carrier aggregation for the terminal.

For example, the network side device configures a triggering condition group. The triggering condition group includes a triggering condition a and a triggering condition b. The triggering condition group corresponds to one piece of handover configuration signaling (for example, RRCReconfig). The handover configuration signaling includes dual connectivity configuration information. One target PCell and one target PSCell are configured in the foregoing handover configuration signaling. The handover configuration signaling may additionally further include a plurality of target SCells. The network side device may configure that the triggering condition a is associated with the target PCell and the triggering condition b is associated with the target PSCell.

Optionally, the cell management configuration information is used for indicating at least one of the following:
performing a handover on a PCell;
performing addition, alteration, deletion or modification on a PSCell; or
performing addition, alteration, deletion or modification on an SCell.

Optionally, the M cells include at least an active cell.

For example, the foregoing M cells include a PCell or an active PSCell and further include an inactive SCell. For example, the triggering condition a is associated with the PCell or the active PSCell, and the triggering condition b is associated with the inactive SCell.

In this way, it can be ensured that after the terminal is handed over between cells, at least one active cell is available for use by the terminal, thereby ensuring the communication performance of the terminal in dual connectivity or carrier aggregation.

Optionally, the M cells do not include at least one of an inactive cell, a cell configured with a dormant function, or a cell configured with a suspend function.

For example, the foregoing M cells do not include an inactive SCell or an SCell configured with a dormant function. The M cells do not include an inactive PSCell, a PSCell configured with a dormant function, or a PSCell configured with a suspend function.

In this way, it can be ensured that after the terminal is handed over between cells, an active cell is available for use by the terminal, thereby ensuring the communication performance of the terminal in dual connectivity or carrier aggregation.

Optionally, the M cells are all active cells.

For example, the foregoing M cells include a PCell and further include a PSCell in an active state or an SCell in an active state.

In this way, it can be ensured that after the terminal is handed over between cells, an active cell is available for use by the terminal, thereby ensuring the communication performance of the terminal in dual connectivity or carrier aggregation.

A dual connectivity application scenario and a carrier aggregation application scenario are separately combined to use a plurality of embodiments below to describe the cell management method in the embodiments of the present disclosure below in detail.

Embodiment 1

The cell management configuration information includes dual connectivity configuration information. The triggering condition group includes a first triggering condition associated with a first PCell (a primary cell PCell of a primary cell group), and the triggering condition group further includes a second triggering condition associated with a first PSCell. Optionally, an initial state of the first PSCell may be an active state.

In an example, the first triggering condition may be: measured signal quality of the first PCell is higher (or not lower) than measured signal quality of a source PCell, or measured signal quality of the first PCell is higher (or not lower) than a threshold T1. The second triggering condition may be: measured signal quality of the first PSCell is higher (or not lower) than a threshold T2.

In the embodiment, according to whether the first triggering condition is satisfied and whether the second triggering condition is satisfied, the terminal may use one of the following manners to manage the first PCell and the first PSCell. Details are as follows.

Manner 1: In a case that both the first triggering condition and the second triggering condition are satisfied, connect to the first PCell and the first PSCell.

In this manner, both the first triggering condition and the second triggering condition are satisfied, both the first PCell and the first PSCell have relatively high channel quality, and both the first PCell and the first PSCell are available for use by the terminal in a dual connectivity scenario. Therefore, the terminal may connect to the first PCell and the first PSCell.

Manner 2: In a case that the first triggering condition is satisfied and the second triggering condition is not satisfied, connect to the first PCell, and set the first PSCell to an inactive state or suspend the first PSCell or set the first PSCell to a dormant working mode or delete the first PSCell or delete a secondary cell group SCG corresponding to the first PSCell.

In this manner, the first triggering condition is satisfied, the first PCell has relatively high channel quality, and the first PCell is available for use by the terminal in a dual connectivity scenario. Therefore, the terminal may connect to the first PCell. The second triggering condition is not satisfied, and the first PSCell has relatively low channel quality. To avoid occupying a reserved resource of the first PSCell, the terminal may set the first PSCell to an inactive state or suspend the first PSCell or set the first PSCell to a dormant working mode or delete the first PSCell or delete a secondary cell group (SCG) corresponding to the first PSCell.

Embodiment 2

The cell management configuration information includes carrier aggregation configuration information. The triggering condition group includes a third triggering condition associated with a first special cell (SpCell). The triggering condition group further includes a fourth triggering condition associated with a first SCell. The first SpCell may be a PCell or may be a PSCell. Optionally, an initial state of the first SCell may be an active state.

In an example, the first SpCell is a second PCell, and the third triggering condition may be: measured signal quality of the second PCell is higher (or not lower) than measured signal quality of a source PCell, or measured signal quality of the second PCell is higher (or not lower) than a threshold T1. The fourth triggering condition may be: measured signal quality of the first PCell is higher (or not lower) than a threshold T2.

The foregoing measured signal quality may include a reference signal received power (RSRP), reference signal received quality (RSRQ), or a signal-to-interference-plus-noise ratio (SINR), and the like.

In the embodiment, according to whether the third triggering condition is satisfied and whether the fourth triggering condition is satisfied, the terminal may use one of the following manners to manage the first SpCell and the first SCell. For example:

Manner 1: In a case that both the third triggering condition and the fourth triggering condition are satisfied, connect to the first SpCell and the first SCell.

In this manner, both the third triggering condition and the fourth triggering condition are satisfied, both the first SpCell and the first SCell have relatively high channel quality, and both the first SpCell and the first SCell are available for use by the terminal in a carrier aggregation scenario. Therefore, the terminal may connect to the first SpCell and the first SCell.

Manner 2: In a case that the third triggering condition is satisfied and the fourth triggering condition is not satisfied, connect to the first SpCell, and set the first SCell to an inactive state or suspend the first SCell or set the first SCell to a dormant working mode or delete the first SCell.

In this manner, the third triggering condition is satisfied, the first SpCell has relatively high channel quality, and the first SpCell is available for use by the terminal in a carrier aggregation scenario. Therefore, the terminal may connect to the first SpCell. The fourth triggering condition is not satisfied, and the first SCell has relatively low channel quality. To avoid occupying a reserved resource of the first SCell, the terminal may set the first SCell to an inactive state or suspend the first SCell or set the first SCell to a dormant working mode or delete the first SCell.

Embodiment 3

The cell management configuration information includes carrier aggregation configuration information. The triggering condition group includes a fifth triggering condition associated with a second SCell. The triggering condition group further includes a sixth triggering condition associated with a third SCell. Initial states of the second SCell and the third SCell may both be active states.

In an example, the fifth triggering condition may be: measured signal quality of the second PCell is higher (or not lower) than a threshold T1. The sixth triggering condition may be: measured signal quality of the third PCell is higher (or not lower) than a threshold T2.

In the embodiment, according to whether the fifth triggering condition is satisfied and whether the sixth triggering condition is satisfied, the terminal may use one of the following manners to manage the second SCell and the third SCell. For example:

Manner 1: In a case that both the fifth triggering condition and the sixth triggering condition are satisfied, connect to the second SCell and the third SCell.

In this manner, both the fifth triggering condition and the sixth triggering condition are satisfied, both the second SCell and the third SCell have relatively high channel quality, and both the second SCell and the third SCell are available for use by the terminal in a carrier aggregation scenario. Therefore, the terminal may connect to the second SCell and the third SCell.

Manner 2: In a case that the fifth triggering condition is satisfied and the sixth triggering condition is not satisfied, connect to the second SCell, and set the third SCell to an inactive state or suspend the third SCell or set the third SCell to a dormant working mode or delete the third SCell.

In this manner, the fifth triggering condition is satisfied, the second SCell has relatively high channel quality, and the second SCell is available for use by the terminal in a carrier aggregation scenario. Therefore, the terminal may connect to the second SCell. The sixth triggering condition is not satisfied, and the third SCell has relatively low channel quality. To avoid occupying a reserved resource of the third SCell, the terminal may set the third SCell to an inactive state or suspend the third SCell or set the third SCell to a dormant working mode or delete the third SCell.

For Manner 2 in the foregoing Embodiment 1 to Embodiment 3, the terminal may further report status information of related cells to the network side device (reference may be made to the following optional implementations for details) for the network side device to learn the status information of the related cells, and resources corresponding to the related cells are provided for use by other terminals, to avoid a waste of reserved resources of the related cells.

Optionally, in a case that the terminal sets the first PSCell to the inactive state or suspends the first PSCell or sets the first PSCell to the dormant working mode or deletes the first PSCell, the terminal reports status information of the first PSCell to the network side device.

Optionally, in a case that the terminal deletes the SCG corresponding to the first PSCell, the terminal reports status information of the SCG corresponding to the first PSCell to the network side device.

Optionally, in a case that the terminal sets the first SCell to the inactive state or suspends the first SCell or sets the first SCell to the dormant working mode or deletes the first SCell, the terminal reports status information of the first SCell to the network side device.

Optionally, in a case that the terminal sets the third SCell to the inactive state or suspends the third SCell or sets the third SCell to the dormant working mode or deletes the third SCell, the terminal reports status information of the third SCell to the network side device.

In combination with the foregoing implementations, in the embodiments of the present disclosure, a triggering condition group used for cell management is configured for a terminal, and one or more triggering conditions associated with a plurality of cells are configured in the triggering condition group. In this way, the terminal can manage the plurality of associated cells according to the triggering conditions in the triggering condition group. Because the terminal can manage the plurality of cells, the cell management method in the embodiments of the present disclosure is applicable to a multi-cell connection scenario, so that the terminal can implement a conditional handover between cells in the multi-cell connection scenario.

Figure 3:
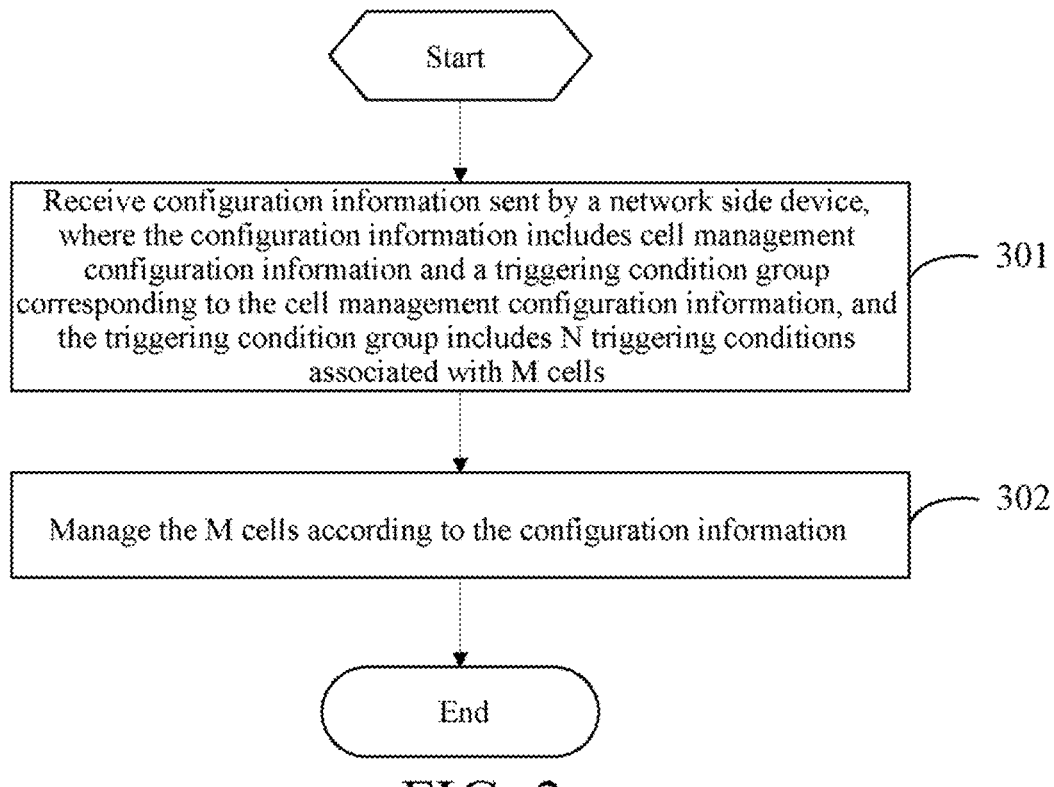
FIG. 3 is a flowchart of a cell management method according to an embodiment of the present disclosure.

FIG. 3 is a flowchart of a cell management method according to an embodiment of the present disclosure. The method is applied to a terminal. As shown in FIG. 3, the method includes the following steps.

Step 301: Receive configuration information sent by a network side device, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, M is greater than 1, and N is greater than or equal to 1.

Step 302: Manage the M cells according to the configuration information.

Optionally, the cell management configuration information includes dual connectivity configuration information or carrier aggregation configuration information.

Optionally, the cell management configuration information is used for indicating at least one of the following:
performing a handover on a PCell;
performing addition, alteration, deletion or modification on a cell PSCell; or
performing addition, alteration, deletion or modification on an SCell.

Optionally, the M cells include at least an active cell; or the M cells do not include at least one of an inactive cell, a cell configured with a dormant function, or a cell configured with a suspend function; or
the M cells are all active cells.

Optionally, the cell management configuration information includes dual connectivity configuration information; and
the triggering condition group includes a first triggering condition associated with a first primary cell PCell and a second triggering condition associated with a first PSCell.

Optionally, an initial state of the first PSCell is an active state.

Optionally, the managing the M cells according to the configuration information includes:
in a case that both the first triggering condition and the second triggering condition are satisfied, connecting to the first PCell and the first PSCell; or
in a case that the first triggering condition is satisfied and the second triggering condition is not satisfied, connecting to the first PCell, and setting the first PSCell to an inactive state or suspending the first PSCell or setting the first PSCell to a dormant working mode or deleting the first PSCell or deleting a secondary cell group SCG corresponding to the first PSCell.

Optionally, the cell management configuration information includes carrier aggregation configuration information; and
the triggering condition group includes a third triggering condition associated with a first special cell SpCell and a fourth triggering condition associated with a first secondary cell SCell.

Optionally, an initial state of the first SCell is an active state.

Optionally, the managing the M cells according to the configuration information includes:
in a case that both the third triggering condition and the fourth triggering condition are satisfied, connecting to the first SpCell and the first SCell; or
in a case that the third triggering condition is satisfied and the fourth triggering condition is not satisfied, connecting to the first SpCell, and setting the first SCell to an inactive state or suspending the first SCell or setting the first SCell to a dormant working mode or deleting the first SCell.

Optionally, the cell management configuration information includes carrier aggregation configuration information; and
the triggering condition group includes a fifth triggering condition associated with a second SCell and a sixth triggering condition associated with a third SCell.

Optionally, initial states of the second SCell and the third SCell are active states.

Optionally, the managing the M cells according to the configuration information includes:
in a case that both the fifth triggering condition and the sixth triggering condition are satisfied, connecting to the second SCell and the third SCell; or
in a case that the fifth triggering condition is satisfied and the sixth triggering condition is not satisfied, connecting to the second SCell, and setting the third SCell to an inactive state or suspending the third SCell or setting the third SCell to a dormant working mode or deleting the third SCell.

Optionally, the method further includes any one of the following:

in a case that the terminal sets the first PSCell to the inactive state or suspends the first PSCell or sets the first PSCell to the dormant working mode or deletes the first PSCell, reporting status information of the first PSCell to the network side device;

in a case that the terminal deletes the SCG corresponding to the first PSCell, reporting status information of the SCG corresponding to the first PSCell to the network side device;

in a case that the terminal sets the first SCell to the inactive state or suspends the first SCell or sets the first SCell to the dormant working mode or deletes the first SCell, reporting status information of the first SCell to the network side device; and in a case that the terminal sets the third SCell to the inactive state or suspends the third SCell or sets the third SCell to the dormant working mode or deletes the third SCell, reporting status information of the third SCell to the network side device.

It should be noted that this embodiment is an implementation of the terminal corresponding to the embodiment shown in FIG. 2. For an implementation of this embodiment, reference may be made to related description of the embodiment shown in FIG. 2, and the same beneficial effects are achieved. To avoid repetition, details are not described herein again.

Figure 4:
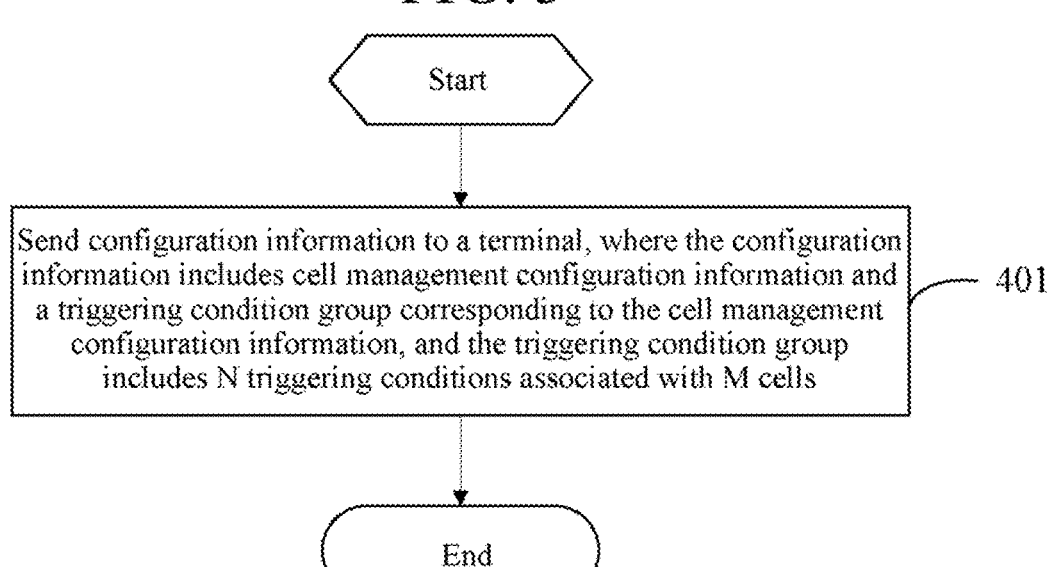
FIG. 4 is a flowchart of a cell management configuration method according to an embodiment of the present disclosure.

FIG. 4 is a flowchart of a cell management configuration method according to an embodiment of the present disclosure. The method is applied to a network side device. As shown in FIG. 4, the method includes the following steps.

Step 401: Send configuration information to a terminal, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, the configuration information is used for managing the M cells by the terminal, M is greater than 1, and N is greater than or equal to 1.

Optionally, the cell management configuration information includes dual connectivity configuration information or carrier aggregation configuration information.

Optionally, the cell management configuration information is used for indicating at least one of the following:
performing a handover on a PCell;
performing addition, alteration, deletion or modification on a PSCell; or
performing addition, alteration, deletion or modification on a SCell.

Optionally, the M cells include at least an active cell; or the M cells do not include an inactive cell, a cell configured with a dormant function, or a cell configured with a suspend function; or
the M cells are all active cells.

Optionally, the cell management configuration information includes dual connectivity configuration information; and
the triggering condition group includes a first triggering condition associated with a first primary cell PCell and a second triggering condition associated with a first PSCell.

Optionally, an initial state of the first PSCell is an active state.

Optionally, the cell management configuration information includes carrier aggregation configuration information; and the triggering condition group includes a third triggering condition associated with a first special cell SpCell and a fourth triggering condition associated with a first secondary cell SCell.

Optionally, an initial state of the first SCell is an active state.

Optionally, the cell management configuration information includes carrier aggregation configuration information; and the triggering condition group includes a fifth triggering condition associated with a second SCell and a sixth triggering condition associated with a third SCell.

Optionally, initial states of the second SCell and the third SCell are active states.

Optionally, the method further includes any one of the following:
in a case that the terminal sets the first PSCell to the inactive state or suspends the first PSCell or sets the first PSCell to the dormant working mode or deletes the first PSCell, receiving status information of the first PSCell reported by the terminal;

in a case that the terminal deletes the SCG corresponding to the first PSCell, receiving status information of the SCG corresponding to the first PSCell reported by the terminal;

in a case that the terminal sets the first SCell to the inactive state or suspends the first SCell or sets the first SCell to the dormant working mode or deletes the first SCell, receiving status information of the first SCell reported by the terminal; and in a case that the terminal sets the third SCell to the inactive state or suspends the third SCell or sets the third SCell to the dormant working mode or deletes the third SCell, receiving status information of the third SCell reported by the terminal.

It should be noted that this embodiment is an implementation of the network side device corresponding to the embodiment shown in FIG. 2. For an implementation of this embodiment, reference may be made to related description of the embodiment shown in FIG. 2, and the same beneficial effects are achieved. To avoid repetition, details are not described herein again.

Figure 5:
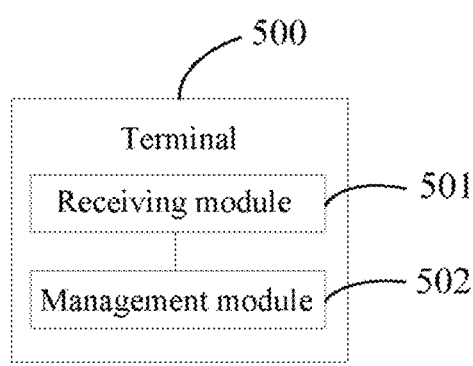
FIG. 5 is a structural diagram of a terminal according to an embodiment of the present disclosure.

FIG. 5 is a structural diagram of a terminal according to an embodiment of the present disclosure. As shown in FIG. 5, a terminal 500 includes:

a receiving module 501, configured to receive configuration information sent by a network side device, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, M is greater than 1, and N is greater than or equal to 1; and a management module 502, configured to manage the M cells according to the configuration information.

Optionally, the cell management configuration information includes dual connectivity configuration information or carrier aggregation configuration information.

Optionally, the cell management configuration information is used for indicating at least one of the following:
performing a handover on a PCell;
performing addition, alteration, deletion or modification on a PSCell; or performing addition, alteration, deletion or modification on a SCell.

Optionally, the M cells include at least an active cell; or the M cells do not include at least one of an inactive cell, a cell configured with a dormant function, or a cell configured with a suspend function; or the M cells are all active cells.

Optionally, the cell management configuration information includes dual connectivity configuration information; and the triggering condition group includes a first triggering condition associated with a first primary cell PCell and a second triggering condition associated with a first PSCell.

Optionally, an initial state of the first PSCell is an active state.

Optionally, the management module 502 may be configured to:

in a case that both the first triggering condition and the second triggering condition are satisfied, connect to the first PCell and the first PSCell; or in a case that the first triggering condition is satisfied and the second triggering condition is not satisfied, connect to the first PCell, and set the first PSCell to an inactive state or suspend the first PSCell or set the first PSCell to a dormant working mode or delete the first PSCell or delete a secondary cell group SCG corresponding to the first PSCell.

Optionally, the cell management configuration information includes carrier aggregation configuration information; and the triggering condition group includes a third triggering condition associated with a first special cell SpCell and a fourth triggering condition associated with a first secondary cell SCell.

Optionally, an initial state of the first SCell is an active state.

Optionally, the management module 502 may be configured to:

in a case that both the third triggering condition and the fourth triggering condition are satisfied, connect to the first SpCell and the first SCell; or in a case that the third triggering condition is satisfied and the fourth triggering condition is not satisfied, connect to the first SpCell, and set the first SCell to an inactive state or suspend the first SCell or set the first SCell to a dormant working mode or delete the first SCell.

Optionally, the cell management configuration information includes carrier aggregation configuration information; and the triggering condition group includes a fifth triggering condition associated with a second SCell and a sixth triggering condition associated with a third SCell.

Optionally, initial states of the second SCell and the third SCell are active states.

Optionally, the management module 502 may be configured to:

in a case that both the fifth triggering condition and the sixth triggering condition are satisfied, connect to the second SCell and the third SCell; or in a case that the fifth triggering condition is satisfied and the sixth triggering condition is not satisfied, connect to the second SCell, and set the third SCell to an inactive state or suspend the third SCell or set the third SCell to a dormant working mode or delete the third SCell.

Optionally, the terminal 500 further includes a reporting module, and the reporting module is configured to:

in a case that the terminal sets the first PSCell to the inactive state or suspends the first PSCell or sets the first PSCell to the dormant working mode or deletes the first PSCell, report status information of the first PSCell to the network side device; or in a case that the terminal deletes the SCG corresponding to the first PSCell, report status information of the SCG corresponding to the first PSCell to the network side device; or in a case that the terminal sets the first SCell to the inactive state or suspends the first SCell or sets the first SCell to the dormant working mode or deletes the first SCell, report status information of the first SCell to the network side device; or in a case that the terminal sets the third SCell to the inactive state or suspends the third SCell or sets the third SCell to the dormant working mode or deletes the third SCell, report status information of the third SCell to the network side device.

The terminal provided in the embodiment of the present disclosure can implement various processes implemented by the terminal in the method embodiment of FIG. 3. To avoid repetition, details are not described herein again.

Figure 6:
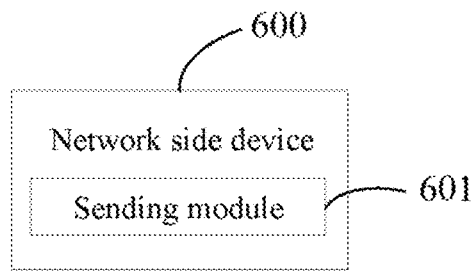
FIG. 6 is a structural diagram of a network side device according to an embodiment of the present disclosure.

FIG. 6 is a structural diagram of a network side device according to an embodiment of the present disclosure. As shown in FIG. 6, a network side device 600 includes:

a sending module 601, configured to send configuration information to a terminal, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, the configuration information is used for managing the M cells by the terminal, M is greater than 1, and N is greater than or equal to 1.

Optionally, the cell management configuration information includes dual connectivity configuration information or carrier aggregation configuration information.

Optionally, the cell management configuration information is used for indicating at least one of the following:

performing a handover on a PCell;

performing addition, alteration, deletion or modification on a PSCell; or performing addition, alteration, deletion or modification on an SCell.

Optionally, the M cells include at least an active cell; or the M cells do not include an inactive cell, a cell configured with a dormant function, or a cell configured with a suspend function; or the M cells are all active cells.

Optionally, the cell management configuration information includes dual connectivity configuration information; and the triggering condition group includes a first triggering condition associated with a first primary cell PCell and a second triggering condition associated with a first PSCell.

Optionally, an initial state of the first PSCell is an active state.

Optionally, the cell management configuration information includes carrier aggregation configuration information; and the triggering condition group includes a third triggering condition associated with a first special cell SpCell and a fourth triggering condition associated with a first secondary cell SCell.

Optionally, an initial state of the first SCell is an active state.

Optionally, the cell management configuration information includes carrier aggregation configuration information; and the triggering condition group includes a fifth triggering condition associated with a second SCell and a sixth triggering condition associated with a third SCell.

Optionally, initial states of the second SCell and the third SCell are active states.

Optionally, the network side device 600 further includes a receiving module, and the receiving module is configured to:

in a case that the terminal sets the first PSCell to the inactive state or suspends the first PSCell or sets the first PSCell to the dormant working mode or deletes the first PSCell, receive status information of the first PSCell reported by the terminal; or in a case that the terminal deletes the SCG corresponding to the first PSCell, receive status information of the SCG corresponding to the first PSCell reported by the terminal; or in a case that the terminal sets the first SCell to the inactive state or suspends the first SCell or sets the first SCell to the dormant working mode or deletes the first SCell, receive status information of the first SCell reported by the terminal; or in a case that the terminal sets the third SCell to the inactive state or suspends the third SCell or sets the third SCell to the dormant working mode or deletes the third SCell, receive status information of the third SCell reported by the terminal.

The network side device provided in the embodiment of the present disclosure can implement various processes implemented by the network side device in the method embodiment of FIG. 4. To avoid repetition, details are not described herein again.

Figure 7:
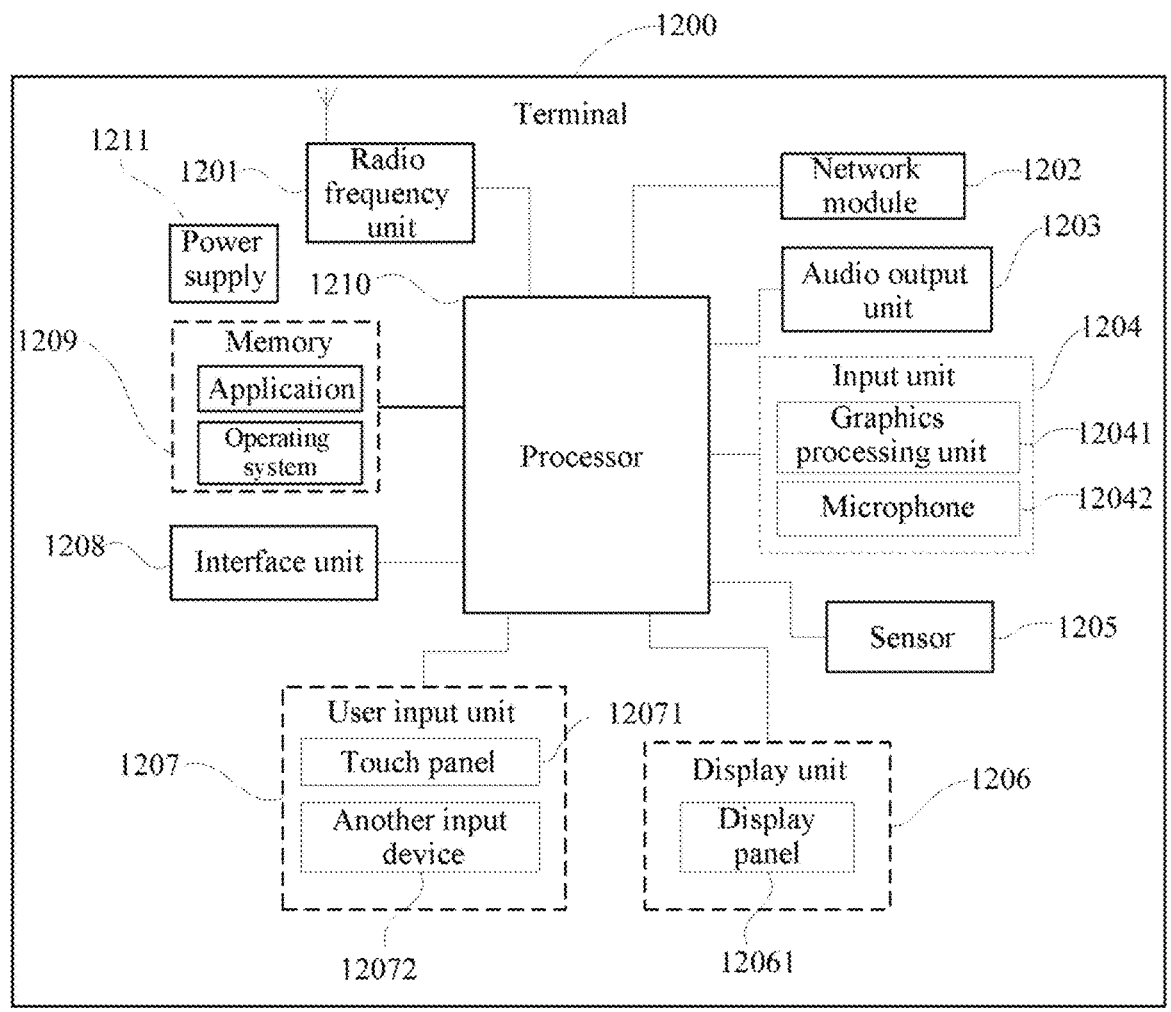
FIG. 7 is a structural diagram of another terminal according to an embodiment of the present disclosure.

FIG. 7 is a schematic diagram of a hardware structure of a terminal according to various embodiments of the present disclosure.

The terminal 1200 includes, but is not limited to, components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that a terminal structure shown in FIG. 7 constitutes no limitation on the terminal, and the terminal may include more or fewer components than those shown in the figure, or some components may be combined, or a different component deployment may be used. In the embodiments of the present disclosure, the terminal includes, but is not limited to, a mobile phone, a tablet computer, a notebook computer, a palmtop computer, an in-vehicle terminal, a wearable device, a pedometer, and the like.

The radio frequency unit 1201 or the processor 1210 is configured to:

receive configuration information sent by a network side device, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, M is greater than 1, and N is greater than or equal to 1; and manage the M cells according to the configuration information.

Optionally, the cell management configuration information includes dual connectivity configuration information or carrier aggregation configuration information.

Optionally, the cell management configuration information is used for indicating at least one of the following:

performing a handover on a PCell;

performing addition, alteration, deletion or modification on a PSCell; and performing addition, alteration, deletion or modification on an SCell.

Optionally, the M cells include at least an active cell; or the M cells do not include at least one of an inactive cell, a cell configured with a dormant function, or a cell configured with a suspend function; or the M cells are all active cells.

Optionally, the cell management configuration information includes dual connectivity configuration information; and the triggering condition group includes a first triggering condition associated with a first primary cell PCell and a second triggering condition associated with a first PSCell.

Optionally, an initial state of the first PSCell is an active state.

Optionally, the radio frequency unit 1201 or the processor 1210 is further configured to:

in a case that both the first triggering condition and the second triggering condition are satisfied, connect to the first PCell and the first PSCell; or in a case that the first triggering condition is satisfied and the second triggering condition is not satisfied, connect to the first PCell, and set the first PSCell to an inactive state or suspend the first PSCell or set the first PSCell to a dormant working mode or delete the first PSCell or delete a secondary cell group SCG corresponding to the first PSCell.

Optionally, the cell management configuration information includes carrier aggregation configuration information; and the triggering condition group includes a third triggering condition associated with a first special cell SpCell and a fourth triggering condition associated with a first secondary cell SCell.

Optionally, an initial state of the first SCell is an active state.

Optionally, the radio frequency unit 1201 or the processor 1210 is further configured to:

in a case that both the third triggering condition and the fourth triggering condition are satisfied, connect to the first SpCell and the first SCell; or in a case that the third triggering condition is satisfied and the fourth triggering condition is not satisfied, connect to the first SpCell, and set the first SCell to an inactive state or suspend the first SCell or set the first SCell to a dormant working mode or delete the first SCell.

Optionally, the cell management configuration information includes carrier aggregation configuration information; and the triggering condition group includes a fifth triggering condition associated with a second SCell and a sixth triggering condition associated with a third SCell.

Optionally, initial states of the second SCell and the third SCell are active states.

Optionally, the radio frequency unit 1201 or the processor 1210 is further configured to:
- in a case that both the fifth triggering condition and the sixth triggering condition are satisfied, connect to the second SCell and the third SCell; or
- in a case that the fifth triggering condition is satisfied and the sixth triggering condition is not satisfied, connect to the second SCell, and set the third SCell to an inactive state or suspend the third SCell or set the third SCell to a dormant working mode or delete the third SCell.

Optionally, the radio frequency unit 1201 or the processor 1210 is further configured to:
- in a case that the terminal sets the first PSCell to the inactive state or suspends the first PSCell or sets the first PSCell to the dormant working mode or deletes the first PSCell, report status information of the first PSCell to the network side device;
- in a case that the terminal deletes the SCG corresponding to the first PSCell, report status information of the SCG corresponding to the first PSCell to the network side device;
- in a case that the terminal sets the first SCell to the inactive state or suspends the first SCell or sets the first SCell to the dormant working mode or deletes the first SCell, report status information of the first SCell to the network side device; and
- in a case that the terminal sets the third SCell to the inactive state or suspends the third SCell or sets the third SCell to the dormant working mode or deletes the third SCell, report status information of the third SCell to the network side device.

It should be understood that in this embodiment, the foregoing processor 1210 or radio frequency unit 1201 provided in the embodiment of the present disclosure can implement various processes implemented by the terminal in the method embodiment of FIG. 3. To avoid repetition, details are not described herein again.

It should be understood that in the embodiments of the present disclosure, the radio frequency unit 1201 may be configured to send and receive a signal during an information receiving and sending process or a call process. For example, the radio frequency unit receives downlink data from a base station, and then delivers the downlink data to the processor 1210 for processing; and in addition, sends uplink data to the base station. Generally, the radio frequency unit 1201 includes, but is not limited to, an antenna, at least one amplifier, a transceiver, a coupler, a low noise amplifier, a duplexer, and the like. In addition, the radio frequency unit 1201 may further communicate with another device through a wireless communication system.

The terminal provides wireless broadband Internet access for a user by using the transmission module 1202, for example, helps the user to send and receive an email, browse a webpage, and access stream media, and the like.

The audio output unit 1203 may convert audio data received by the radio frequency unit 1201 or the network module 1202 or stored in the memory 1209 into an audio signal and output the audio signal as sound. Moreover, the audio output unit 1203 may provide an audio output (such as call signal receiving sound or message receiving sound) related to a specific function executed by the terminal 1200. The audio output unit 1203 includes a loudspeaker, a buzzer, a receiver, and the like.

The input unit 1204 is configured to receive an audio signal or a video signal. The input unit 1204 may include a graphics processing unit (GPU) 12041 and a microphone 12042. The GPU 12041 processes image data of a static picture or a video that is obtained by an image acquisition apparatus (for example, a camera) in a video acquisition mode or an image acquisition mode. An image frame that has been processed may be displayed on a display unit 1206. The image frame that has been processed by the GPU 12041 may be stored in the memory 1209 (or another storage medium) or sent by using the radio frequency unit 1201 or the network module 1202. The microphone 12042 may receive a sound, and can process the sound into audio data. The processed audio data may be converted, in a phone talk mode, into a format that may be sent to a mobile communication base station via the radio frequency unit 1201 for output.

The terminal 1200 further includes at least one sensor 1205 such as an optical sensor, a motion sensor, and other sensors. The optical sensor includes an ambient light sensor and a proximity sensor, where the ambient light sensor may adjust luminance of the display panel 12061 according to the luminance of the ambient light, and the proximity sensor may switch off the display panel 12061 and/or backlight when the terminal 1200 is moved to the ear. As one type of motion sensor, an acceleration sensor may detect magnitude of accelerations in various directions (generally on three axes), may detect magnitude and a direction of the gravity when static, and may be configured to recognize the attitude of the mobile phone (for example, switching between landscape orientation and portrait orientation, a related game, and magnetometer attitude calibration), a function related to vibration recognition (such as a pedometer and a knock), and the like. The sensor 1205 may further include a fingerprint sensor, a pressure sensor, an iris sensor, a molecular sensor, a gyroscope, a barometer, a hygrometer, a thermometer, and an infrared sensor, and the like. Details are not described herein again.

The display unit 1206 is configured to display information input by the user or information provided for the user. The display unit 1206 may include a display panel 12061, and the display panel 12061 may be configured by using a liquid crystal display (LCD), an organic light-emitting diode (OLED), or the like.

The user input unit 1207 may be configured to receive input digit or character information, and generate key signal input related to the user setting and function control of the terminal. The user input unit 1207 includes a touch panel 12071 and another input device 12072. The touch panel 12071, also referred to as a touchscreen, may collect a touch operation of a user on or near the touch panel (such as an operation of a user on or near the touch panel 12071 by using any suitable object or attachment, such as a finger or a touch pen). The touch panel 12071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1210. Moreover, the touch controller receives and executes a command sent from the processor 1210. In addition, the touch panel 12071 may be implemented by using various types, such as a resistive type, a capacitive type, an infrared type, and a surface acoustic wave type. In addition to the touch panel 12071, the user input unit 1207 may further include the another input device 12072. The another input device 12072 may include, but not limited to, a physical keyboard, a functional key (such as a volume control key or a switch key), a track ball, a mouse, and a joystick. Details are not described herein again.

Optionally, the touch panel 12071 may cover the display panel 12061. After detecting a touch operation on or near the touch panel 12071, the touch panel 12071 transfers the touch operation to the processor 1210, so as to determine a type of the touch event. Then, the processor 1210 provides corresponding visual output on the display panel 12061 according to the type of the touch event. Although, in FIG. 7, the touch panel 12071 and the display panel 12061 are used as two separate parts to implement input and output functions of the terminal, in some embodiments, the touch panel 12071 and the display panel 12061 may be integrated to implement the input and output functions of the terminal, which are not limited herein.

The interface unit 1208 is an interface for connecting an external apparatus to the terminal 1200. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 1208 may be configured to receive an input (such as data information or electric power) from an external apparatus and transmit the received input to one or more elements in the terminal 1200 or may be configured to transmit data between the terminal 1200 and an external apparatus.

The memory 1209 may be configured to store a software program and various data. The memory 1209 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 1209 may include a high-speed random access memory, and may further include a nonvolatile memory, such as at least one magnetic disk storage device, a flash memory, or another volatile solid-state storage device.

The processor 1210 is the control center of the terminal, and is connected to various parts of the terminal by using various interfaces and lines. By running or executing the software program and/or module stored in the memory 1209, and invoking data stored in the memory 1209, the processor 1210 performs various functions and data processing of the terminal, thereby performing overall monitoring on the terminal. The processor 1210 may include one or more processing units. Optionally, the processor 1210 may integrate an application processor and a modem processor. The application processor mainly processes an operating system, a user interface, an application, and the like. The modem processor mainly processes wireless communication. It may be understood that the modulation and demodulation processor may not be integrated into the processor 1210.

The terminal 1200 further includes a power supply 1211 (such as a battery) for supplying power to the components. Optionally, the power supply 1211 may be logically connected to the processor 1210 by using a power management system, thereby implementing functions such as charging, discharging, and power consumption management by using the power management system.

In addition, the terminal 1200 includes some functional modules that are not shown. Details are not described herein again.

Optionally, the embodiments of the present disclosure further provide a terminal, including the processor 1210 and the memory 1209 and a computer program stored in the memory 1209 and executable on the processor 1210, where the computer program implements various processes of the embodiments of the foregoing cell management method when being executed by the processor 1210, and can achieve the same technical effects. To avoid repetition, details are not described herein again.

Figure 8:
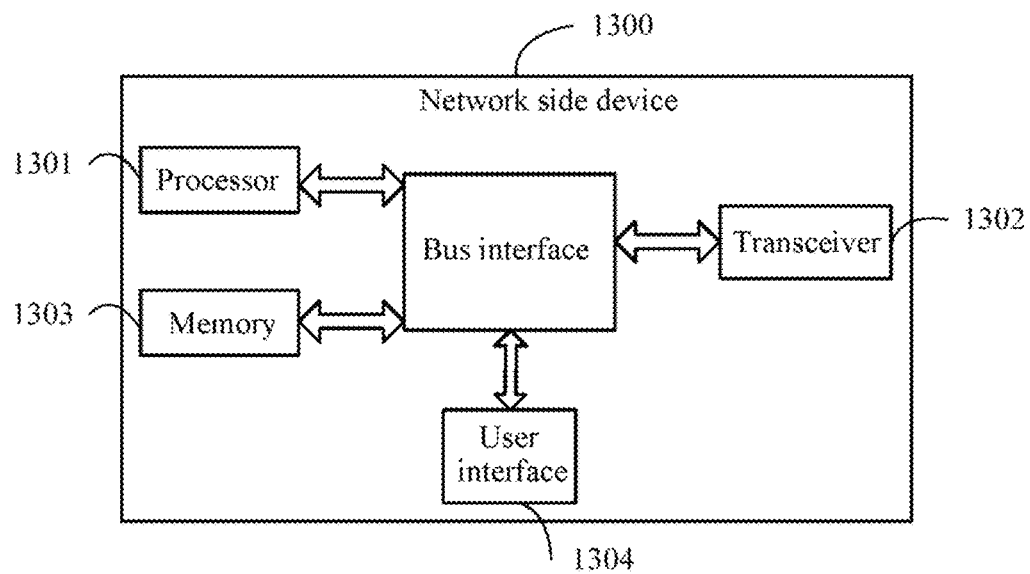
FIG. 8 is a structural diagram of another network side device according to an embodiment of the present disclosure.

FIG. 8 is a structural diagram of another network side device according to an embodiment of the present disclosure. As shown in FIG. 8, the network side device 1300 includes a processor 1301, a transceiver 1302, a memory 1303, and a bus interface.

The transceiver 1302 or the processor 1301 is configured to:

send configuration information to a terminal, where the configuration information includes cell management configuration information and a triggering condition group corresponding to the cell management configuration information, the triggering condition group includes N triggering conditions associated with M cells, each cell of the M cells is associated with at least one triggering condition of the N triggering conditions, the configuration information is used for managing the M cells by the terminal, M is greater than 1, and N is greater than or equal to 1.

Optionally, the cell management configuration information includes dual connectivity configuration information or carrier aggregation configuration information.

Optionally, the cell management configuration information is used for indicating at least one of the following:
performing a handover on a PCell;
performing addition, alteration, deletion or modification on a PSCell; or
performing addition, alteration, deletion or modification on an SCell.

Optionally, the M cells include at least an active cell; or
the M cells do not include an inactive cell, a cell configured with a dormant function, or a cell configured with a suspend function; or
the M cells are all active cells.

Optionally, the cell management configuration information includes dual connectivity configuration information; and
the triggering condition group includes a first triggering condition associated with a first primary cell PCell and a second triggering condition associated with a first PSCell.

Optionally, an initial state of the first PSCell is an active state.

Optionally, the cell management configuration information includes carrier aggregation configuration information; and
the triggering condition group includes a third triggering condition associated with a first special cell SpCell and a fourth triggering condition associated with a first secondary cell SCell.

Optionally, an initial state of the first SCell is an active state.

Optionally, the cell management configuration information includes carrier aggregation configuration information; and the triggering condition group includes a fifth triggering condition associated with a second SCell and a sixth triggering condition associated with a third SCell.

Optionally, initial states of the second SCell and the third SCell are active states.

Optionally, the transceiver 1302 or the processor 1301 is further configured to:

in a case that the terminal sets the first PSCell to the inactive state or suspends the first PSCell or sets the first PSCell to the dormant working mode or deletes the first PSCell, receive status information of the first PSCell reported by the terminal;

in a case that the terminal deletes the SCG corresponding to the first PSCell, receive status information of the SCG corresponding to the first PSCell reported by the terminal;

in a case that the terminal sets the first SCell to the inactive state or suspends the first SCell or sets the first SCell to the dormant working mode or deletes the first SCell, receive status information of the first SCell reported by the terminal; and in a case that the terminal sets the third SCell to the inactive state or suspends the third SCell or sets the third SCell to the dormant working mode or deletes the third SCell, receive status information of the third SCell reported by the terminal.

It should be understood that in this embodiment, the foregoing processor 1301 or transceiver 1302 provided in the embodiment of the present disclosure can implement various processes implemented by the network side device in the method embodiment of FIG. 4. To avoid repetition, details are not described herein again.

In FIG. 8, a bus architecture may include any quantity of interconnected buses and bridges, and may connects together circuits that are of one or more processors represented by the processor 1301 and of a memory represented by the memory 1303. The bus architecture may further connect various other circuits of a peripheral device, a voltage regulator, a power management circuit, and the like. This is well known in the art, and therefore, no further description is provided in this specification. The bus interface provides an interface. The transceiver 1302 may be a plurality of components, including a transmitter and a receiver, and providing units for communicating with various other apparatuses on a transmission medium. For different user equipment, the user interface 1304 may be an interface capable of externally or internally connecting a required device. The connected device includes, but not limited to, a keypad, a display, a speaker, a microphone, and a joystick.

The processor 1301 is responsible for the management of the bus architecture and normal processing, and the memory 1303 may store data used when the processor 1301 performs an operation.

Optionally, the embodiments of the present disclosure further provide a network side device, including the processor 1301 and the memory 1303 and a computer program stored in the memory 1303 and executable on the processor 1301, where the computer program implements various processes of the embodiments of the foregoing cell management configuration method when being executed by the processor 1301, and can achieve the same technical effects. To avoid repetition, details are not described herein again.

An embodiment of the present disclosure further provides a non-transitory computer-readable storage medium, storing a computer program, where the computer program implements various processes of the embodiments of the cell management configuration method on a side of a network side device provided in the embodiments of the present disclosure when being executed by a processor, or the computer program implements various processes of the embodiments of the cell management method on a terminal side provided in the embodiments of the present disclosure when being executed by a processor, and can achieve the same technical effects. To avoid repetition, details are not described herein again. The non-transitory computer-readable storage medium is, for example, a read-only memory (ROM), a random access memory (RAM), a magnetic disk, an optical disc, or the like.

It should be noted that the terms "include", "include", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

In the embodiments provided in the present application, it is to be understood that the disclosed apparatus and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the related technology may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a base station, or the like) to perform the methods described in the embodiments of the present disclosure.

It may be understood that the embodiments described in the embodiments of the present invention may be implemented by hardware, software, firmware, middleware, microcode, or a combination thereof. For hardware implementation, modules, units, and subunits may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented in the processor or outside the processor.

The embodiments of the present disclosure have been described above with reference to the accompanying drawings. The present disclosure is not limited to the specific embodiments described above, and the specific embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A cell management method, applied to a terminal, and comprising:
    receiving configuration information sent by a network side device, wherein the configuration information comprises cell management configuration information and a triggering condition group corresponding to the cell management configuration information, the triggering condition group comprises N triggering conditions associated with M cells, each cell of the M cells is associated with at least one triggering condition of the N triggering conditions, M is greater than 1, and N is greater than or equal to 1; and
    managing the M cells according to the configuration information;
    wherein the cell management configuration information comprises dual connectivity configuration information or carrier aggregation configuration information;
    wherein in a case that the cell management configuration information comprises dual connectivity configuration information, and the triggering condition group comprises a first triggering condition associated with a first primary cell (PCell) and a second triggering condition associated with a first primary secondary cell (PSCell), the managing the M cells according to the configuration information comprises:
    in a case that both the first triggering condition and the second triggering condition are satisfied, connecting to the first PCell and the first PSCell; or
    in a case that the first triggering condition is satisfied and the second triggering condition is not satisfied, connecting to the first PCell, and setting the first PSCell to an inactive state or suspending the first PSCell or setting the first PSCell to a dormant working mode or deleting the first PSCell or deleting a secondary cell group (SCG) corresponding to the first PSCell;
    wherein in a case that the cell management configuration information comprises carrier aggregation configuration information, and the triggering condition group comprises a third triggering condition associated with a first special cell (SpCell) and a fourth triggering condition associated with a first secondary cell (SCell), the managing the M cells according to the configuration information comprises:
    in a case that both the third triggering condition and the fourth triggering condition are satisfied, connecting to the first SpCell and the first SCell; or
    in a case that the third triggering condition is satisfied and the fourth triggering condition is not satisfied, connecting to the first SpCell, and setting the first SCell to an inactive state or suspending the first SCell or setting the first SCell to a dormant working mode or deleting the first SCell;
    wherein in a case that the cell management configuration information comprises carrier aggregation configuration information, and the triggering condition group comprises a fifth triggering condition associated with a second SCell and a sixth triggering condition associated with a third SCell, the managing the M cells according to the configuration information comprises:
    in a case that both the fifth triggering condition and the sixth triggering condition are satisfied, connecting to the second SCell and the third SCell; or
    in a case that the fifth triggering condition is satisfied and the sixth triggering condition is not satisfied, connecting to the second SCell, and setting the third SCell to an inactive state or suspending the third SCell or setting the third SCell to a dormant working mode or deleting the third SCell.

2. The method according to claim 1, wherein the cell management configuration information is used for indicating at least one of following:
    performing a handover on a PCell;
    performing addition, alteration, deletion or modification on a PSCell; or
    performing addition, alteration, deletion or modification on a SCell.

3. A non-transitory computer-readable storage medium, storing a computer program, wherein when the computer program is executed by a processor, steps of the cell management method according to claim 2 are implemented.

4. The method according to claim 1, wherein the M cells comprise at least an active cell; or
    the M cells do not comprise at least one of an inactive cell, a cell configured with a dormant function, or a cell configured with a suspend function; or
    the M cells are all active cells.

5. A non-transitory computer-readable storage medium, storing a computer program, wherein when the computer program is executed by a processor, steps of the cell management method according to claim 4 are implemented.

6. The method according to claim 1, further comprising:
    in a case that the terminal sets the first PSCell to the inactive state or suspends the first PSCell or sets the first PSCell to the dormant working mode or deletes the first PSCell, reporting status information of the first PSCell to the network side device;
    in a case that the terminal deletes the SCG corresponding to the first PSCell, reporting status information of the SCG corresponding to the first PSCell to the network side device.

7. The method according to claim 1, further comprising:
    in a case that the terminal sets the first SCell to the inactive state or suspends the first SCell or sets the first SCell to the dormant working mode or deletes the first SCell, reporting status information of the first SCell to the network side device.

8. The method according to claim 1, further comprising:
in a case that the terminal sets the third SCell to the inactive state or suspends the third SCell or sets the third SCell to the dormant working mode or deletes the third SCell, reporting status information of the third SCell to the network side device.

9. A non-transitory computer-readable storage medium, storing a computer program, wherein when the computer program is executed by a processor, steps of the cell management method according to claim 1 are implemented.

10. A cell management configuration method, applied to a network side device, and comprising:
sending configuration information to a terminal, wherein the configuration information comprises cell management configuration information and a triggering condition group corresponding to the cell management configuration information, the triggering condition group comprises N triggering conditions associated with M cells, each cell of the M cells is associated with at least one triggering condition of the N triggering conditions, the configuration information is used for managing the M cells by the terminal, M is greater than 1, and N is greater than or equal to 1;
wherein the cell management configuration information comprises dual connectivity configuration information; and the triggering condition group comprises a first triggering condition associated with a first primary cell (PCell) and a second triggering condition associated with a first primary secondary cell (PSCell); or
the cell management configuration information comprises carrier aggregation configuration information; and the triggering condition group comprises a third triggering condition associated with a first special cell (SpCell) and a fourth triggering condition associated with a first secondary cell (SCell); or
the cell management configuration information comprises carrier aggregation configuration information; and the triggering condition group comprises a fifth triggering condition associated with a second SCell and a sixth triggering condition associated with a third SCell.

11. The method according to claim 10, wherein the cell management configuration information is used for indicating at least one of following:
performing a handover on a PCell;
performing addition, alteration, deletion or modification on a PSCell; or
performing addition, alteration, deletion or modification on a SCell.

12. The method according to claim 10, wherein the M cells comprise at least an active cell; or
the M cells do not comprise an inactive cell, a cell configured with a dormant function, or a cell configured with a suspend function; or
the M cells are all active cells.

13. The method according to claim 10, further comprising any one of following:
in a case that the terminal sets the first PSCell to the inactive state or suspends the first PSCell or sets the first PSCell to the dormant working mode or deletes the first PSCell, receiving status information of the first PSCell reported by the terminal;
in a case that the terminal deletes the SCG corresponding to the first PSCell, receiving status information of the SCG corresponding to the first PSCell reported by the terminal;
in a case that the terminal sets the first SCell to the inactive state or suspends the first SCell or sets the first SCell to the dormant working mode or deletes the first SCell, receiving status information of the first SCell reported by the terminal; and
in a case that the terminal sets the third SCell to the inactive state or suspends the third SCell or sets the third SCell to the dormant working mode or deletes the third SCell, receiving status information of the third SCell reported by the terminal.

14. A non-transitory computer-readable storage medium, storing a computer program, wherein when the computer program is executed by a processor, steps of the cell management configuration method according to claim 10 are implemented.

15. A terminal, comprising a memory, a processor, and a program stored in the memory and executable on the processor, wherein the program, when executed by the processor, causes the terminal to perform:
receiving configuration information sent by a network side device, wherein the configuration information comprises cell management configuration information and a triggering condition group corresponding to the cell management configuration information, the triggering condition group comprises N triggering conditions associated with M cells, each cell of the M cells is associated with at least one triggering condition of the N triggering conditions, M is greater than 1, and N is greater than or equal to 1; and
managing the M cells according to the configuration information;
wherein the cell management configuration information comprises dual connectivity configuration information or carrier aggregation configuration information;
wherein in a case that the cell management configuration information comprises dual connectivity configuration information, and the triggering condition group comprises a first triggering condition associated with a first primary cell (PCell) and a second triggering condition associated with a first primary secondary cell (PSCell), the program, when executed by the processor, causes the terminal to perform:
in a case that both the first triggering condition and the second triggering condition are satisfied, connecting to the first PCell and the first PSCell; or
in a case that the first triggering condition is satisfied and the second triggering condition is not satisfied, connecting to the first PCell, and setting the first PSCell to an inactive state or suspending the first PSCell or setting the first PSCell to a dormant working mode or deleting the first PSCell or deleting a secondary cell group (SCG) corresponding to the first PSCell;
wherein in a case that the cell management configuration information comprises carrier aggregation configuration information, and the triggering condition group comprises a third triggering condition associated with a first special cell (SpCell) and a fourth triggering condition associated with a first secondary cell (SCell), the program, when executed by the processor, causes the terminal to perform:
in a case that both the third triggering condition and the fourth triggering condition are satisfied, connecting to the first SpCell and the first SCell; or
in a case that the third triggering condition is satisfied and the fourth triggering condition is not satisfied, connecting to the first SpCell, and setting the first SCell to an inactive state or suspending the first SCell or setting the first SCell to a dormant working mode or deleting the first SCell;

wherein in a case that the cell management configuration information comprises carrier aggregation configuration information, and the triggering condition group comprises a fifth triggering condition associated with a second SCell and a sixth triggering condition associated with a third SCell, the program, when executed by the processor, causes the terminal to perform:
in a case that both the fifth triggering condition and the sixth triggering condition are satisfied, connecting to the second SCell and the third SCell; or
in a case that the fifth triggering condition is satisfied and the sixth triggering condition is not satisfied, connecting to the second SCell, and setting the third SCell to an inactive state or suspending the third SCell or setting the third SCell to a dormant working mode or deleting the third SCell.

16. The terminal according to claim 15, wherein the cell management configuration information is used for indicating at least one of following:
performing a handover on PCell;
performing addition, alteration, deletion or modification on a PSCell; or
performing addition, alteration, deletion or modification on a SCell.

17. The terminal according to claim 15, wherein the M cells comprise at least an active cell; or
the M cells do not comprise at least one of an inactive cell, a cell configured with a dormant function, or a cell configured with a suspend function; or
the M cells are all active cells.

18. The terminal according to claim 15, wherein the program, when executed by the processor, causes the terminal to further perform:
in a case that the terminal sets the first PSCell to the inactive state or suspends the first PSCell or sets the first PSCell to the dormant working mode or deletes the first PSCell, reporting status information of the first PSCell to the network side device;
in a case that the terminal deletes the SCG corresponding to the first PSCell, reporting status information of the SCG corresponding to the first PSCell to the network side device.

19. The terminal according to claim 15, wherein the program, when executed by the processor, causes the terminal to further perform:
in a case that the terminal sets the first SCell to the inactive state or suspends the first SCell or sets the first SCell to the dormant working mode or deletes the first SCell, reporting status information of the first SCell to the network side device.

20. The terminal according to claim 15, wherein the program, when executed by the processor, causes the terminal to further perform:
in a case that the terminal sets the third SCell to the inactive state or suspends the third SCell or sets the third SCell to the dormant working mode or deletes the third SCell, reporting status information of the third SCell to the network side device.

* * * * *